(12) United States Patent
Iizuka et al.

(10) Patent No.: US 12,007,043 B2
(45) Date of Patent: Jun. 11, 2024

(54) VALVE STRUCTURE AND TURBOCHARGER

(71) Applicant: IHI Corporation, Tokyo (JP)

(72) Inventors: Kuniaki Iizuka, Tokyo (JP); Akimitsu Yakushiji, Tokyo (JP); Koichi Takahashi, Tokyo (JP); Shohei Sato, Tokyo (JP)

(73) Assignee: IHI Corporation, Tokyo (JP)

( * ) Notice: Subject to any disclaimer, the term of this patent is extended or adjusted under 35 U.S.C. 154(b) by 43 days.

(21) Appl. No.: 18/050,617

(22) Filed: Oct. 28, 2022

(65) Prior Publication Data

US 2023/0074193 A1 Mar. 9, 2023

Related U.S. Application Data

(63) Continuation of application No. PCT/JP2021/030972, filed on Aug. 24, 2021.

(30) Foreign Application Priority Data

Sep. 3, 2020 (JP) .................................. 2020-148125

(51) Int. Cl.
*F16K 1/20* (2006.01)
*F02B 37/18* (2006.01)
(Continued)

(52) U.S. Cl.
CPC ............ *F16K 47/012* (2021.08); *F02B 37/18* (2013.01); *F16K 1/2007* (2013.01); *F16K 1/36* (2013.01)

(58) Field of Classification Search
CPC ........ F16K 47/012; F16K 1/2007; F16K 1/36; Y02T 10/12; F02B 37/18; F16F 1/18; F16F 15/073
See application file for complete search history.

(56) References Cited

U.S. PATENT DOCUMENTS

2015/0147162 A1* 5/2015 Stilgenbauer ......... F02B 37/183
                                                                     415/145
2018/0073425 A1    3/2018 Stilgenbauer et al.
(Continued)

FOREIGN PATENT DOCUMENTS

JP      2015-522135 A      8/2015
WO    WO 2014/011468 A1    1/2014
(Continued)

OTHER PUBLICATIONS

International Search Report dated Oct. 26, 2021 in PCT/JP2021/030972 filed Aug. 23, 2021, 2 pages.

*Primary Examiner* — Marina A Tietjen
(74) *Attorney, Agent, or Firm* — Oblon, McClelland, Maier & Neustadt, L.L.P.

(57) ABSTRACT

A valve structure includes: a valve unit including a valve body, a shaft portion extending from the valve body, and a separating portion provided on the shaft portion and spaced apart from the valve body; a mounting plate located between the valve body and the separating portion and including an insertion hole into which the shaft portion is inserted; a holding portion including a first holding surface provided on the mounting plate, and a second holding surface provided on the valve unit and spaced apart from the first holding surface; a protrusion provided on one of the valve unit and the mounting plate, an end of the protrusion protruding beyond the first and second holding surfaces; and an elastic body including a contact portion located between the first and second holding surfaces, and a pressed portion located inside or outside the contact portion and contacting the protrusion.

4 Claims, 14 Drawing Sheets

(51) Int. Cl.
 *F16K 1/36* (2006.01)
 *F16K 47/00* (2006.01)

(56) References Cited

U.S. PATENT DOCUMENTS

| | | | |
|---|---|---|---|
| 2018/0230848 A1* | 8/2018 | Iwata | F16K 1/2035 |
| 2019/0003377 A1 | 1/2019 | Jaenike et al. | |
| 2020/0141308 A1* | 5/2020 | DePaoli | F16K 1/50 |
| 2020/0173353 A1* | 6/2020 | Grabherr | F16K 1/221 |
| 2020/0232472 A1 | 7/2020 | Roemer et al. | |
| 2020/0355113 A1 | 11/2020 | Jaenike et al. | |
| 2021/0087968 A1* | 3/2021 | DePaoli | F16F 3/02 |
| 2021/0108558 A1 | 4/2021 | Huh | |
| 2021/0317777 A1* | 10/2021 | DePaoli | F02B 37/183 |

FOREIGN PATENT DOCUMENTS

| | | |
|---|---|---|
| WO | WO 2017/125241 A1 | 7/2017 |
| WO | WO 2020/008697 A1 | 1/2020 |

\* cited by examiner

VALVE STRUCTURE AND TURBOCHARGER

CROSS REFERENCE TO RELATED APPLICATIONS

This application is a continuation application of International Application No. PCT/JP2021/030972, filed on Aug. 24, 2021, which claims priority to Japanese Patent Application No. 2020-148125 filed on Sep. 3, 2020, the entire contents of which are incorporated herein by reference.

BACKGROUND ART

Technical Field

The present disclosure relates to a valve structure and a turbocharger.

A valve structure shown in Patent Literature 1 is known. This valve structure comprises a valve unit including a valve body and a washer, a mounting plate, and an elastic body consisting of a disc spring. The valve unit includes a shaft connecting the valve body and the washer, and the shaft is inserted into the mounting plate. Clearances are secured between the valve body, mounting plate and washer, and the mounting plate is movable along the shaft. The elastic body is provided between the washer and the mounting plate, and biases the mounting plate toward the valve body.

The valve structure shown in Patent Literature 1 is installed as a wastegate valve in a vehicle turbocharger. The wastegate valve opens and closes a bypass flow path in a turbine. To close the bypass flow path, an actuator connected to the mounting plate is driven. A power of the actuator causes the mounting plate to press the valve body of the wastegate valve against a seat surface. A tapered surface is formed on the valve body on a side closer to the mounting plate to allow the valve body to tilt.

When the bypass flow path is opened, the valve body is spaced apart from the seat surface. In this state, an exhaust pulsation of exhaust gas discharged from the bypass flow path is transmitted to the valve body. When the valve body vibrates due to the exhaust pulsation, contact between the valve unit and the mounting plate may cause noise. A biasing force of the elastic body presses the mounting plate against the valve body to reduce the noise.

CITATION LIST

Patent Literature

Patent Literature 1: WO 2014/011468 A1

SUMMARY

Technical Problem

The elastic body is usually press-formed, which results in a dimensional variation. The dimensional variation in the elastic body causes a variation of the biasing force applied on the mounting plate. When the biasing force is too strong, the valve body is less likely to tilt when pressed against the seat surface, resulting in poor sealing performance. In contrast, when the biasing force is too weak, there is an increased risk of noise generation when the bypass flow path is opened. Accordingly, a technique to reduce the variation in the biasing force of the elastic body has been required.

The present disclosure aims to provide a valve structure and a turbocharger that can reduce a variation in a biasing force of an elastic body.

Solution to Problem

To solve the above problem, a valve structure of the present disclosure includes: a valve unit including a valve body, a shaft portion extending from the valve body in an axial direction, and a separating portion provided on the shaft portion and spaced apart from the valve body in the axial direction; a mounting plate located between the valve body and the separating portion and including an insertion hole into which the shaft portion is inserted; a holding portion including a first holding surface provided on the mounting plate, and a second holding surface provided on the valve unit and spaced apart from the first holding surface in the axial direction; a protrusion provided on one of the valve unit and the mounting plate, an end of the protrusion protruding in the axial direction beyond the first holding surface and the second holding surface; and an elastic body including a contact portion located between the first holding surface and the second holding surface, and a pressed portion located inside or outside the contact portion in a radial direction of the shaft portion and contacting the protrusion.

The valve structure may include an opposing portion provided on the other of the valve unit and the mounting plate and opposed to the protrusion in the axial direction.

To solve the above problem, a turbocharger of the present disclosure includes the valve structure described above.

Effects of Disclosure

According to the present disclosure, the variation in the biasing force of the elastic body can be reduced.

DESCRIPTION OF EMBODIMENTS

Embodiments of the present disclosure will be described in detail below with reference to the accompanying drawings. Specific dimensions, materials, and numerical values described in the embodiments are merely examples for a better understanding, and do not limit the present disclosure unless otherwise specified. In this specification and the drawings, duplicate explanations are omitted for elements having substantially the same functions and configurations by assigning the same reference sign. Furthermore, elements not directly related to the present disclosure are omitted from the figures.

Figure 1:
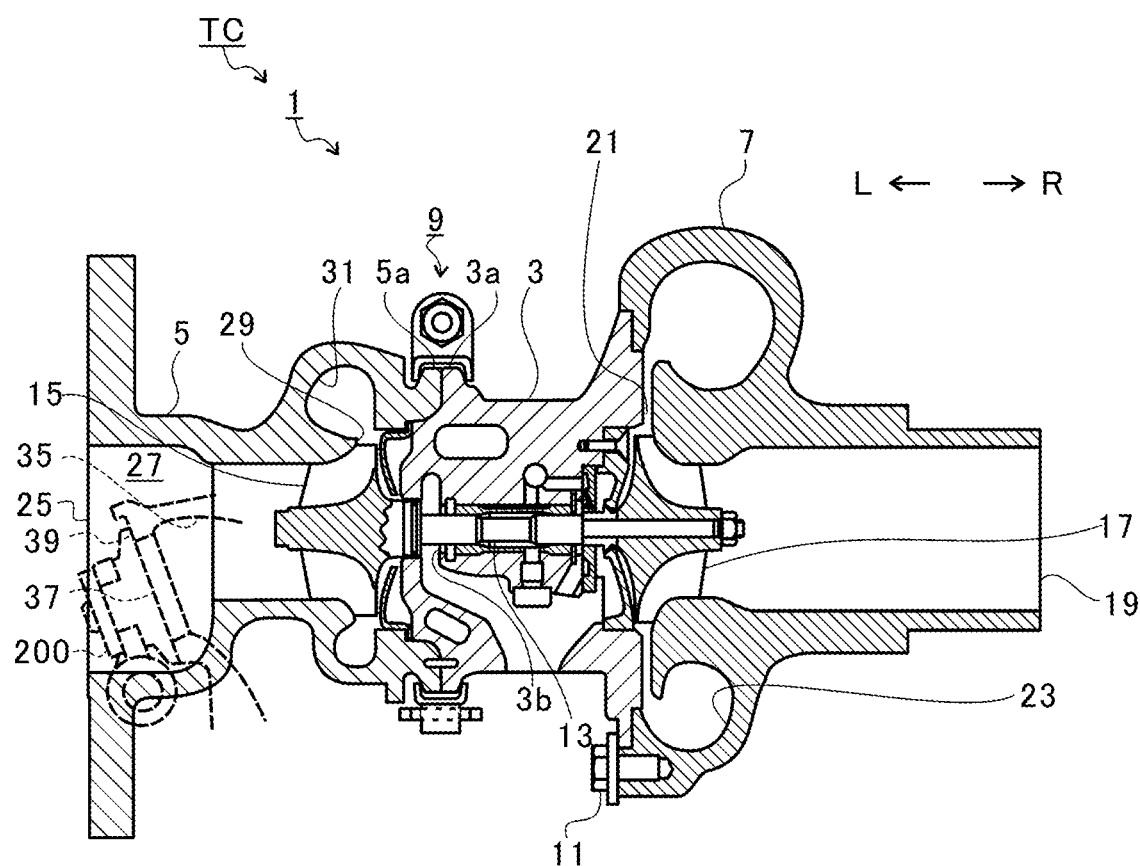
FIG. 1 is a schematic cross-sectional view of a turbocharger.

FIG. 1 is a schematic cross-sectional view of a turbocharger TC. Hereinafter, a direction indicated by an arrow L in FIG. 1 is described as the left side of the turbocharger TC. A direction indicated by an arrow R in FIG. 1 is described as the right side of the turbocharger TC. As shown in FIG. 1, the turbocharger TC comprises a turbocharger body 1. The turbocharger body 1 includes a bearing housing 3, a turbine housing 5, and a compressor housing 7. The turbine housing 5 is connected to the left side of the bearing housing 3 by a fastener 9. The compressor housing 7 is connected to the right side of the bearing housing 3 by fastening bolts 11.

A protrusion 3a is provided on an outer surface of the bearing housing 3. The protrusion 3a is provided closer to the turbine housing 5. The protrusion 3a radially protrudes from the bearing housing 3. A protrusion 5a is provided on an outer surface of the turbine housing 5. The protrusion 5a is provided closer to the bearing housing 3. The protrusion 5a radially protrudes from the turbine housing 5. The bearing housing 3 and the turbine housing 5 are band-fastened by the fastener 9. The fastener 9 includes, for example, a G-coupling. The fastener 9 clamps the protrusions 3a and 5a.

A bearing hole 3b is formed in the bearing housing 3. The bearing hole 3b passes through the bearing housing 3 in the left-to-right direction of the turbocharger TC. A bearing is arranged in the bearing hole 3b. A shaft 13 is inserted into the bearing. The bearing rotatably supports the shaft 13. In this embodiment, the bearing is a sliding bearing. However, the bearing is not limited thereto, and may be a rolling bearing. A turbine impeller 15 is provided at a left end of the shaft 13. The turbine impeller 15 is rotatably housed in the turbine housing 5. A compressor impeller 17 is provided at a right end of the shaft 13. The compressor impeller 17 is rotatably housed in the compressor housing 7.

An inlet 19 is formed in the compressor housing 7. The inlet 19 opens to the right side of the turbocharger TC. The inlet 19 is connected to an air cleaner (not shown). A diffuser flow path 21 is formed by surfaces of the bearing housing 3 and the compressor housing 7. The diffuser flow path 21 pressurizes air. The diffuser flow path 21 is formed in an annular shape. The diffuser flow path 21 is connected to the inlet 19 via the compressor impeller 17 at a radially inner part.

A compressor scroll flow path 23 is formed in the compressor housing 7. The compressor scroll flow path 23 is formed in an annular shape. The compressor scroll flow path 23 is located, for example, outside the diffuser flow path 21 in a radial direction of the shaft 13. The compressor scroll flow path 23 is connected to an intake port of an engine (not shown) and the diffuser flow path 21. When the compressor impeller 17 rotates, air is sucked into the compressor housing 7 from the inlet 19. The sucked air is pressurized and accelerated while passing through blades of the compressor impeller 17. The pressurized and accelerated air is pressurized in the diffuser flow path 21 and the compressor scroll flow path 23. The pressurized air is directed to the intake port of the engine.

An outlet 25 is formed in the turbine housing 5. The outlet 25 opens to the left side of the turbocharger TC. The outlet 25 is connected to an exhaust gas purifier (not shown). An internal space 27 is formed inside the turbine housing 5. The internal space 27 opens to the outlet 25. The internal space 27 is formed downstream of the turbine impeller 15 (closer the outlet 25).

A connecting passage 29 and a turbine scroll flow path 31 are formed in the turbine housing 5. The turbine scroll flow path 31 is formed in an annular shape. The turbine scroll flow path 31 is located, for example, outside the connecting passage 29 in the radial direction of the shaft 13. The turbine scroll flow path 31 is connected to a gas inlet 33 (see FIG. 2). Exhaust gas discharged from an exhaust manifold of the engine (not shown) is led to the gas inlet 33. The connecting passage 29 connects the turbine scroll flow path 31 to the outlet 25 (internal space 27) via the turbine impeller 15. The exhaust gas led from the gas inlet 33 to the turbine scroll flow path 31 passes through the connecting passage 29, the turbine impeller 15, and the internal space 27 to the outlet 25. The exhaust gas led to the outlet 25 rotates the turbine impeller 15 while passing therethrough.

A rotational force of the turbine impeller 15 is transmitted to the compressor impeller 17 via the shaft 13. As the compressor impeller 17 rotates, the air is pressurized as described above. As such, the air is directed to the intake port of the engine.

Figure 2:
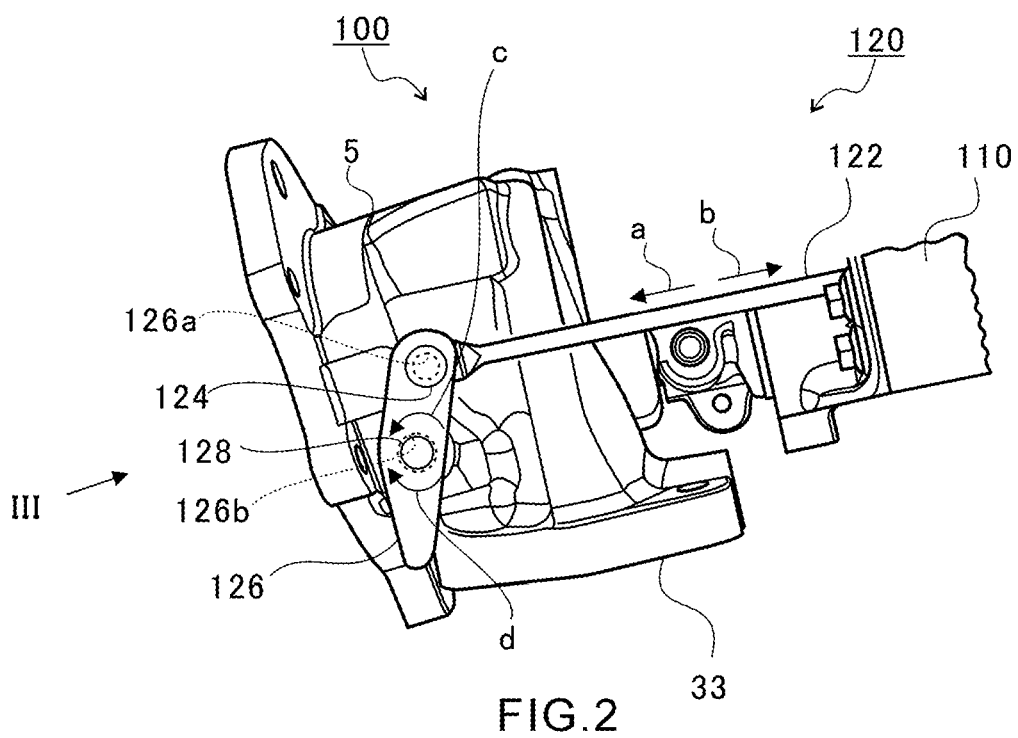
FIG. 2 is an external view of a turbine housing.

FIG. 2 is an external view of the turbine housing 5. As shown in FIG. 2, the turbine housing 5 is provided with a valve device 100. The valve device 100 includes an actuator 110 and a link mechanism 120. The link mechanism 120 includes a rod 122, a connecting pin 124, a link plate 126, and a rotary shaft 128. As shown in FIG. 2, the actuator 110, the rod 122, the connecting pin 124, and the link plate 126 are located outside the turbine housing 5.

The actuator 110 is connected to the rod 122. The actuator 110 moves the rod 122 in a central axis direction of the rod 122 (directions indicated by arrows a and b in FIG. 2). One end of the rod 122 is connected to the actuator 110, and the other end is connected to the connecting pin 124. The connecting pin 124 connects the rod 122 to the link plate 126. In this embodiment, the connecting pin 124 is fixed to the rod 122. The connecting pin 124 rotatably supports the link plate 126.

A pin hole 126a and a shaft hole 126b are formed in the link plate 126. The connecting pin 124 is inserted into the pin hole 126a. The rotary shaft 128 is inserted into the shaft hole 126b. The rotary shaft 128 is fixed to the link plate 126. The rotary shaft 128 integrally rotates with the link plate 126.

When the actuator 110 is driven, the rod 122 moves in the direction of the arrow a or in the direction of the arrow b in FIG. 2. When the rod 122 moves in the direction of the arrow a in FIG. 2, the link plate 126 rotates around the rotary shaft 128 in a direction of an arrow c in FIG. 2. When the rod 122 moves in the direction of the arrow b in FIG. 2, the link plate 126 rotates around the rotary shaft 128 in a direction of an arrow d in FIG. 2.

Figure 3:
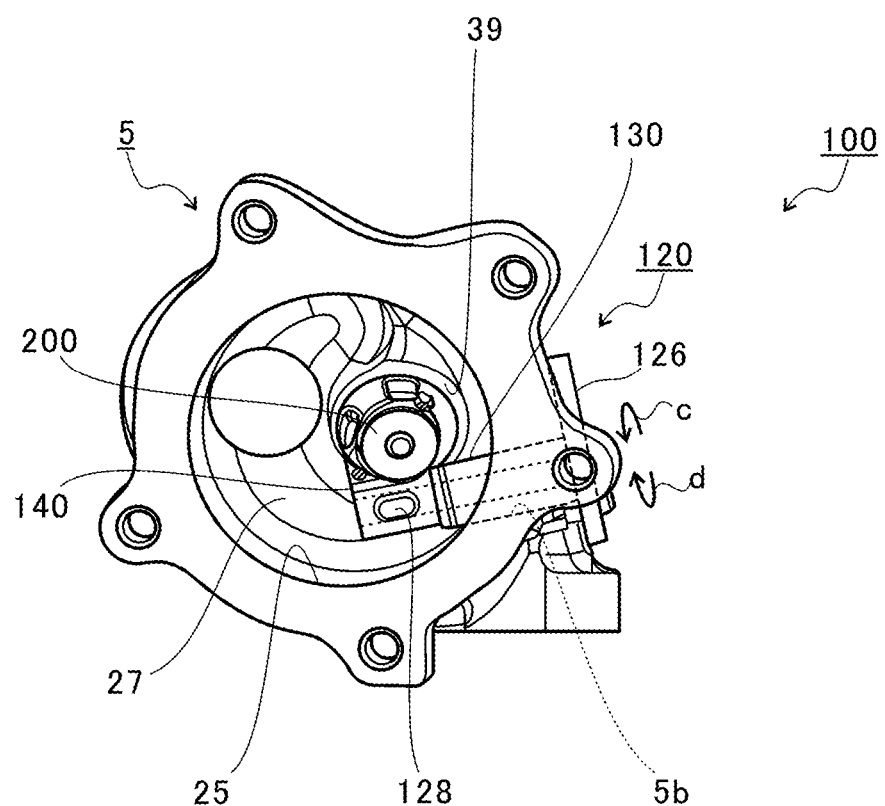
FIG. 3 is a view seen from a direction indicated by arrow III in FIG. 2.

FIG. 3 is a view seen from a direction indicated by an arrow III in FIG. 2. FIG. 3 is an internal view of the turbine housing 5. As shown in FIG. 3, the valve unit 100 further includes a bearing body 130, a mounting plate 140, and a valve unit 200. The bearing body 130, the mounting plate 140, and the valve unit 200 are located in the internal space 27 of the turbine housing 5.

A through hole 5b is formed in the turbine housing 5. The bearing body 130 is inserted into the through hole 5b. The bearing body 130 has a cylindrical shape. The rotary shaft 128 is inserted into the bearing body 130. The bearing body 130 rotatably supports the rotary shaft 128.

One end of the rotary shaft 128 is located outside the turbine housing 5, and the other end is located inside the turbine housing 5. The one end of the rotary shaft 128 is connected to the link plate 126, and the other end is connected to the mounting plate 140. The mounting plate 140 is integrally attached to the rotary shaft 128. For example, the mounting plate 140 is welded to the rotary shaft 128 to integrally rotate with the rotary shaft 128. In this embodiment, the mounting plate 140 is formed separately from the rotary shaft 128. However, the mounting plate 140 is not limited thereto, and may be formed as an integral part of the rotary shaft 128. The valve unit 200 is attached to the mounting plate 140 at a position opposite to the part connected to the rotary shaft 128.

Figure 4:
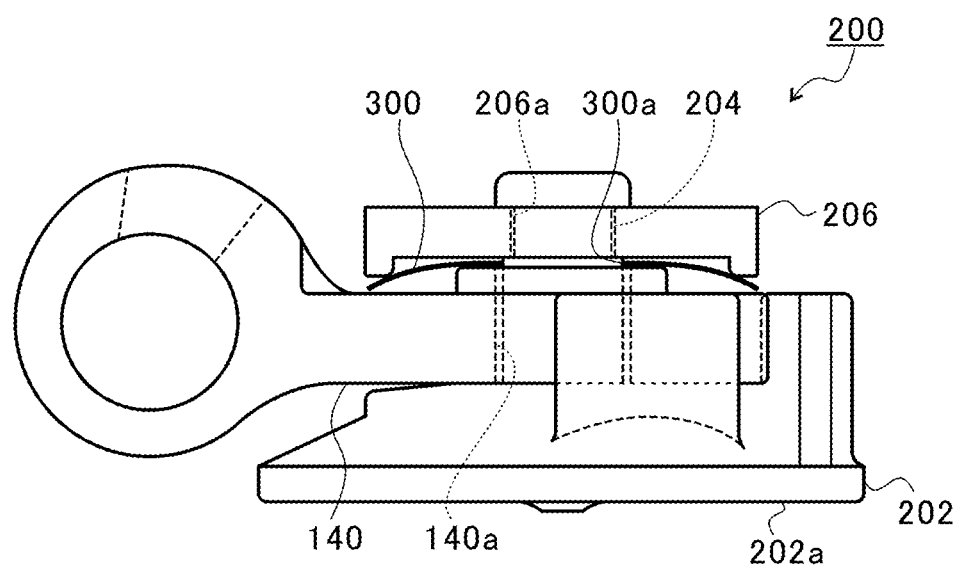
FIG. 4 is an illustration of a connection structure of a valve unit and a mounting plate.

FIG. 4 is an illustration of a connecting structure of the valve unit 200 and the mounting plate 140. As shown in FIG. 4, the valve unit 200 includes a valve body 202, a shaft portion 204, and a separating portion 206. The valve body 202 has a truncated cone shape, and includes a contact surface 202a on a larger-diameter side. The shaft portion 204 is provided on a smaller-diameter side of the valve body 202, i.e., the side opposite to the contact surface 202a. The shaft portion 204 is integrally formed with the valve body 202, and extends in an axial direction from the valve body 202.

The separating portion 206 is attached to the shaft portion 204. In this embodiment, the separating portion 206 is made of a sheet metal that is separate from the valve body 202 and the shaft portion 204. The separating portion 206 has a disk shape including a hole 206a in its center, and is spaced apart from the valve body 202 in the axial direction. The shaft portion 204 is inserted into the hole 206a of the separating portion 206.

The mounting plate 140 is located between the valve body 202 and the separating portion 206. An insertion hole 140a is formed in the mounting plate 140. The shaft portion 204 is inserted into the insertion hole 140a. As will be described in detail later, an end of the shaft portion 204 is caulked to attach the separating portion 206 to the shaft portion 204. However, the separating portion 206 may be attached to the shaft portion 204 by, for example, welding or adhesion.

As shown in FIG. 1, a bypass flow path 35 and a wastegate port 37 are formed in the turbine housing 5. One end of the bypass flow path 35 is connected to the turbine scroll flow path 31, and the other end is connected to the internal space 27 via the wastegate port 37. The bypass flow path 35 connects the turbine scroll flow path 31 to the internal space 27. The bypass flow path 35 and the wastegate port 37 are located radially outside the turbine impeller 15. The wastegate port 37 is formed downstream of the turbine impeller 15 (closer to the outlet 25). The bypass flow path 35 leads a part of the exhaust gas flowing in the turbine scroll flow path 31 to the internal space 27 with bypassing the turbine impeller 15.

In an inner wall forming the internal space 27 of the turbine housing 5, the wastegate port 37 is formed at a seat surface 39 where the valve body 202 can contact. The contact surface 202a of the valve body 202 has an outer diameter larger than an inner diameter of the wastegate port 37. In this embodiment, the valve unit 200 serves as a wastegate valve. The valve body 202 closes the wastegate port 37 when in contact with the seat surface 39. When the wastegate port 37 is closed, the exhaust gas flowing in the turbine scroll flow path 31 cannot flow out to the internal space 27 via the bypass flow path 35.

The valve body 202 opens the wastegate port 37 when spaced apart from the seat surface 39. When the wastegate port 37 is opened, a part of the exhaust gas flowing in the turbine scroll flow path 31 flows out to the internal space 27 via the bypass flow path 35 and the wastegate port 37.

Returning to FIG. 3, when the actuator 110 (see FIG. 2) drives the rotary shaft 128 to rotate in the direction of the arrow c in FIG. 3, the mounting plate 140 integrally rotates with the rotary shaft 128 in the direction of the arrow c in FIG. 3. When the mounting plate 140 rotates in the direction of the arrow c in FIG. 3, the valve unit 200 held by the mounting plate 140 rotates around the rotary shaft 128 in the direction of the arrow c in FIG. 3.

Figure 5:
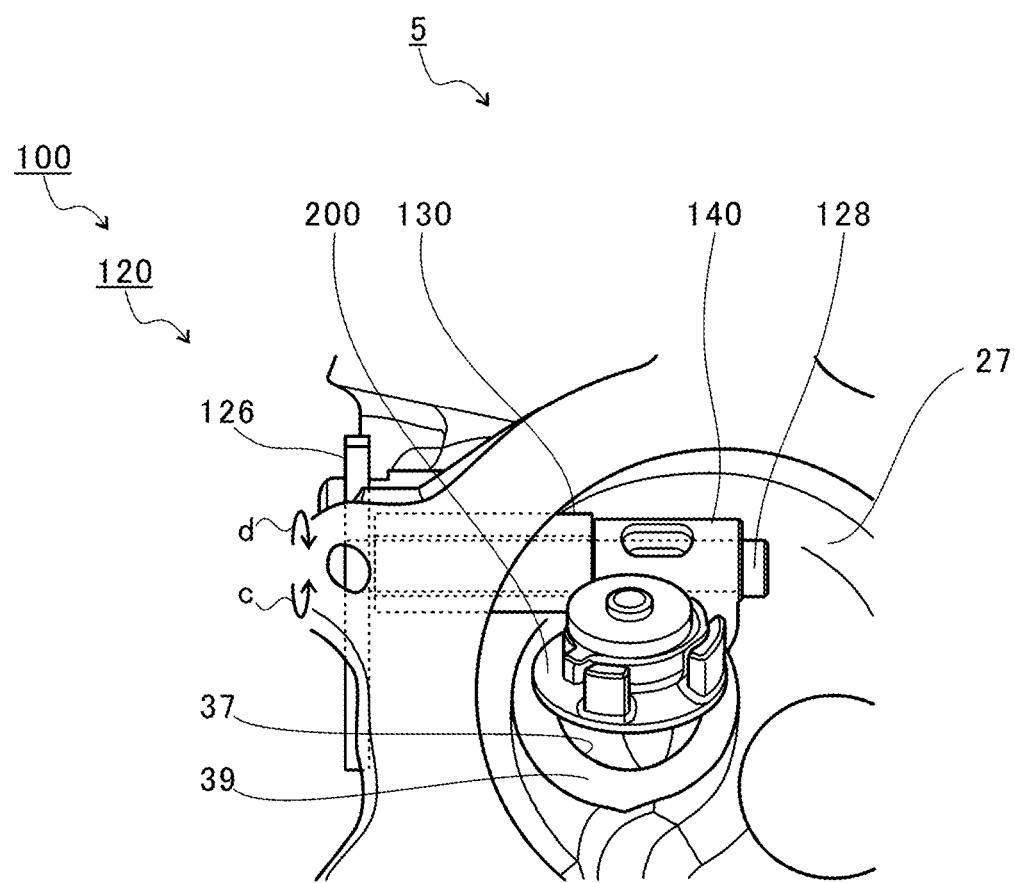
FIG. 5 is an internal view of the turbine housing after the valve unit shown in FIG. 3 has rotated in a direction indicated by arrow c.

FIG. 5 is an internal view of the turbine housing 5 after the valve unit 200 shown in FIG. 3 has rotated in the direction of the arrow c. As shown in FIG. 5, when the valve unit 200 rotates in the direction of the arrow c, the valve body 202 moves in a direction spaced apart from the seat surface 39. When the valve body 202 is spaced apart from the seat surface 39, the wastegate port 37 is opened.

In contrast, when the actuator 110 (see FIG. 2) drives the mounting plate 140 to rotate in the direction of the arrow d in FIG. 5, the valve body 202 rotates around the rotary shaft 128 in the direction of the arrow d in FIG. 5. When the valve body 202 rotates in the direction of the arrow d, the valve body 202 moves in the direction closer to the seat surface 39 as shown in FIG. 3. When the valve body 202 contacts the seat surface 39, the wastegate port 37 is closed.

As shown in FIG. 4, a gap is formed between the mounting plate 140 and the separating portion 206. An elastic body 300 is provided in this gap. In other words, the elastic body 300 is provided between the mounting plate 140 and the separating portion 206. As will be described in detail later, the elastic body 300 includes a disk-shaped flat plate including a through hole 300a in its center, and biases the mounting plate 140 toward the valve body 202. In other words, the elastic body 300 applies a biasing force in a direction spacing apart the mounting plate 140 from the separating portion 206.

The mounting plate 140 is slightly movable between the valve body 202 and the separating portion 206 in the axial direction of the shaft portion 204. Furthermore, an inner diameter of the insertion hole 140a is larger than a diameter of the shaft portion 204. Accordingly, the valve unit 200 can be slightly tilted with respect to the mounting plate 140. When the valve body 202 contacts the seat surface 39, the tilt of the valve body 202 prevents the body 202 from partially contacting the seat surface 39, thereby securing a sealing function.

In contrast, when the valve body 202 is spaced apart from the seat surface 39 and the wastegate port 37 is opened, the exhaust gas is discharged from the wastegate port 37 into the internal space 27. In this state, the exhaust pulsation of the exhaust gas discharged from the bypass flow path 35 is transmitted to the valve body 202. When the valve body 202 vibrates due to the exhaust pulsation, contact between the valve body 202 and the mounting plate 140 may cause noise. According to the present disclosure, the biasing force of the elastic body 300 presses the mounting plate 140 against the valve body 202, thereby reducing the noise.

In a conventional wastegate valve, a press-formed disc spring is used instead of the elastic body 300 of the present disclosure. The press-formed disc spring is likely to include a dimensional variation. The dimensional variation of the disc spring causes a variation in the biasing force applied to the mounting plate 140. When the biasing force is too strong, the valve body 202 is less likely to tilt when the valve body 202 is pressed against the seat surface 39, resulting in poor sealing performance. In contrast, when the biasing force is too weak, the risk of noise generation increases when the wastegate port 37 is opened. According to the present disclosure, a valve structure of the valve device 100 described below reduces the variation in the biasing force of the elastic body 300.

Figure 6:
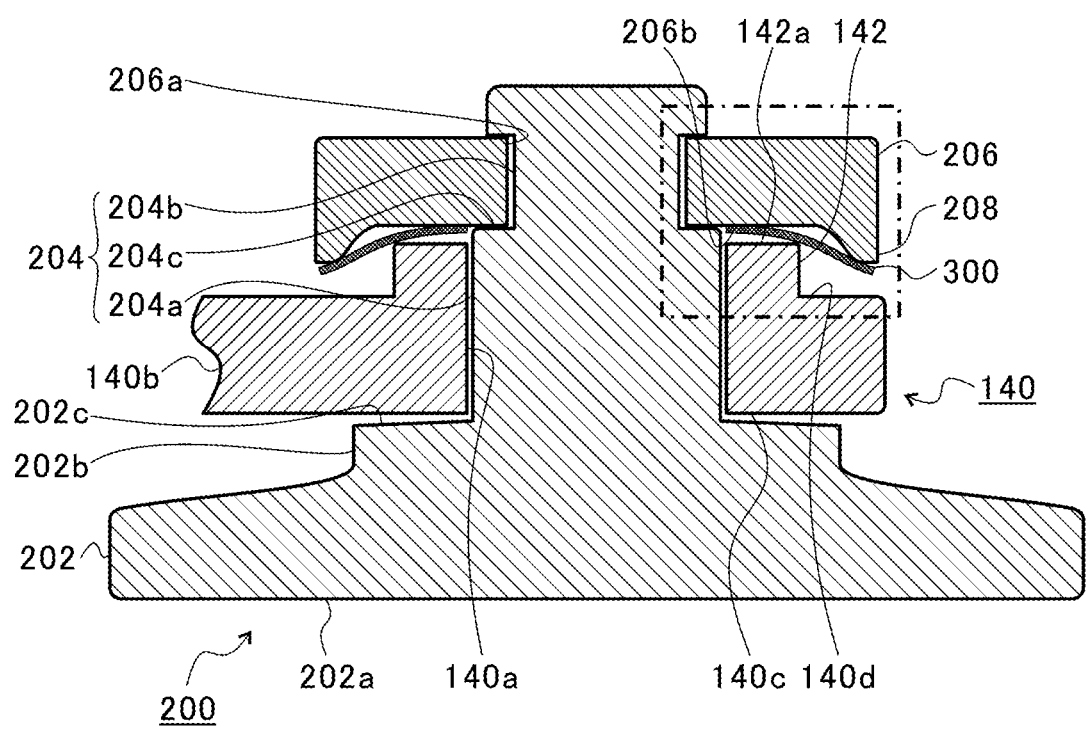
FIG. 6 is a schematic cross-sectional view of the valve unit, the mounting plate, and an elastic body according to an embodiment.

FIG. 6 is a schematic cross-sectional view of the valve unit 200, the mounting plate 140, and the elastic body 300 according to the embodiment. The valve body 202 includes a bulge 202b on a side opposite to the contact surface 202a. The bulge 202b has a circular cross-sectional shape perpendicular to the axial direction of the shaft portion 204, and extends in the axial direction of the shaft portion 204 (hereinafter simply referred to as the "axial direction"). In this embodiment, a length of the bulge 202b in the axial direction is smaller than a thickness from the contact surface 202a to the bulge 202b in the axial direction.

The bulge 202b is located on the side opposite to the contact surface 202a, i.e., closer to the shaft portion 204. A tapered surface 202c crossing the axial direction is formed at an end of the bulge 202b. In this embodiment, the tapered surface 202c is inclined so that a radially inner area protrudes in the axial direction. An outer diameter of the tapered surface 202c is smaller than an outer diameter of the contacting surface 202a.

The shaft portion 204 includes a larger-diameter section 204a and a smaller-diameter section 204b. The larger-diameter section 204a axially extends from the center of the tapered surface 202c. A diameter of the larger-diameter section 204a is smaller than the diameter of the tapered surface 202c. The smaller-diameter section 204b is provided at an end of the larger-diameter section 204a. In other words, the smaller-diameter section 204b is located on a side opposite to the valve body 202 with respect to the larger-diameter section 204a. A diameter of the smaller-diameter section 204b is smaller than the diameter of the larger-diameter section 204a. The smaller-diameter section 204b is continuous with the larger-diameter section 204a. A step surface 204c is formed at a connecting part of the larger-diameter section 204a and the smaller-diameter section 204b. The step surface 204c is an annular flat surface crossing the axial direction. In this embodiment, the step surface 204c is orthogonal to the axial direction.

The mounting plate 140 includes a body 140b including the insertion hole 140a. The body 140b includes a first surface (may also be referred to as a "valve body side opposing surface" in the present disclosure) 140a located on a side closer to the valve body 202. The first surface 140a is configured as a flat surface, and faces the tapered surface 202c. Furthermore, the body 140b also includes a second surface (may also be referred to as a "separating portion side opposing surface" in the present disclosure) 140d located on a side closer to the separating portion 206. The second surface 140d is configured as a flat surface, and is opposed to the separating portion 206.

An annular projection 142 is provided on the second surface 140d of the body 140b. The annular projection 142 projects from the second surface 140d toward the separating portion 206. The annular projection 142 is provided on a periphery of the insertion hole 140a. A first holding surface 142a is provided at an end of the annular projection 142 in a projecting direction. The first holding surface 142a is configured as an annular flat surface. The insertion hole 140a extends from the first surface 140a to the first holding surface 142a.

The larger-diameter section 204a of the shaft portion 204 is inserted into the insertion hole 140a. The inner diameter of the insertion hole 140a is larger than the diameter of the larger-diameter section 204a. Furthermore, a length from the first surface 140a to the first holding surface 142, i.e., an axial length of the insertion hole 140a, is smaller than an axial length of the larger-diameter section 204a. Accordingly, the end closer to the smaller-diameter section 204b of the larger-diameter section 204a and the step surface 204c are located outside the insertion hole 140a.

The separating portion 206 includes a second holding surface 206b located closer to the mounting plate 140. The second holding surface 206b is flat, and is axially spaced apart from and opposed to the first holding surface 142a of the mounting plate 140. As described above, the hole 206a is formed in the center of the separating portion 206. The smaller-diameter section 204b of the shaft portion 204 is inserted into the hole 206a.

An outer diameter of the separating portion 206 is larger than an outer diameter of the annular projection 142. An axial length of the smaller-diameter section 204b is larger than an axial length of the hole 206a. Accordingly, an end of the smaller-diameter section 204b protrudes from the hole 206a. The end of the smaller-diameter section 204b protruding from the hole 206a is caulked, while the second holding surface 206b is pressed against the step surface 204c of the shaft portion 204. As a result, relative movement of the separating portion 206 and the shaft portion 204 is restricted.

The separating portion 206 is provided with a protrusion 208. The protrusion 208 is provided radially outside the second holding surface 206b, and axially protrudes toward the mounting plate 140. The protrusion 208 is provided on an outer periphery of the separating portion 206. Furthermore, an end of the protrusion 208 protrudes in the axial direction beyond the first holding surface 142a of the annular projection 142 and the second holding surface 206b of the separating portion 206.

However, the end of the protrusion 208 is axially spaced apart from the second surface 140d of the mounting plate 140. The separating portion 206 and the mounting plate 140 are axially non-contacting and a gap is formed therebetween.

The elastic body 300 is provided in the gap formed between the separating portion 206 and the mounting plate 140. As described above, the elastic body 300 includes the disk-shaped flat plate, and maintains a flat shape when no external force is applied. In the state where the valve unit 200 is assembled on the mounting plate 140, an external force is applied on the elastic body 300 within the range of elastic deformation of the elastic body 300. In other words, the elastic body 300 is constantly subjected to a restoring force that tries to return the elastic body to the flat shape. This restoring force serves as the biasing force that biases the mounting plate 140 toward the valve body 202. The elastic body 300 may be provided with a plurality of slits extending radially inward from the outer edge. The slits reduce distortion when the elastic deformation occurs.

Figure 7:
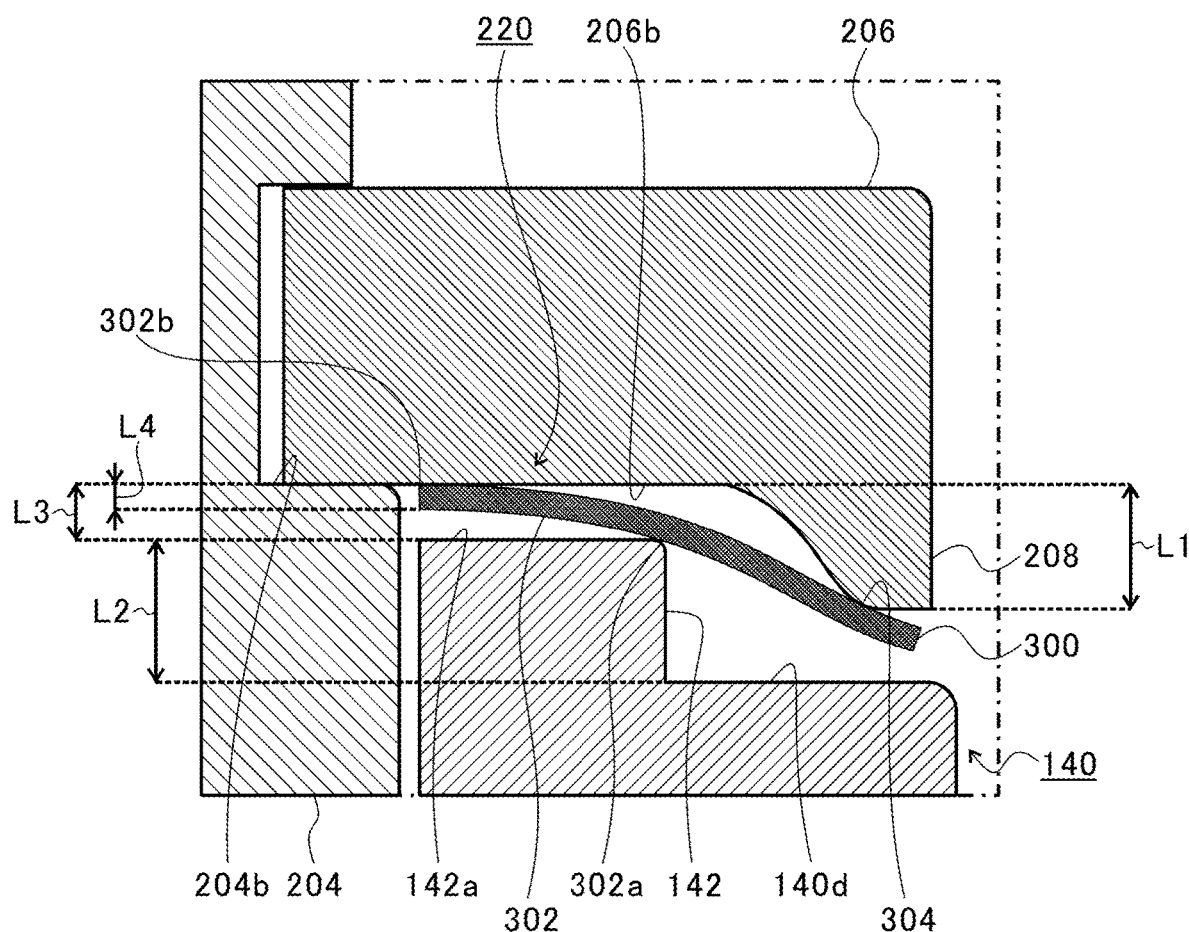
FIG. 7 is an enlarged view of an area enclosed by dashed-dotted lines in FIG. 6.

FIG. 7 is an enlarged view of an area enclosed by dashed-dotted lines in FIG. 6. As shown in FIG. 7, an axial projection height of the protrusion 208 is shown as L1. Similarly, an axial projection height of the annular projection 142 is shown as L2. Also shown in FIG. 7 is L3, where L3 is the maximum axial separation between the mounting plate 140 and the separating portion 206. This maximum gap can also be referred to as a maximum separation between the mounting plate 140 and the valve body 202. A thickness of the elastic body 300, i.e., a plate thickness, is shown as L4 in FIG. 7. Accordingly, an axial play of the mounting plate 140, i.e., the maximum gap between the valve unit 200 and the mounting plate 140 is L3-L4. In other words, the mounting plate 140 can axially move relative to the valve unit 200 by L3-L4.

In this embodiment, the projection height L2 of the annular projection 142 is larger than the projection height L1 of the protrusion 208. The projection height L1 of the protrusion 208 is larger than the maximum gap L3 between the mounting plate 140 and the separating portion 206. In other words, in this embodiment, the dimensional relationship of L2>L1>L3 is maintained. This dimensional relationship allows the end of the protrusion 208 to protrude beyond the first holding surface 142a toward the mounting plate 140.

A holding portion 220 includes the first holding surface 142a and the second holding surface 206b. Specifically, the holding portion 220 includes the first holding surface 142a provided on the mounting plate 140, and the second holding surface 206b provided on the valve unit 200 and axially spaced apart from the first holding surface 142a. The holding portion 220 is defined within an area where the first holding surface 142a and the second holding surface 206b are substantially opposed to each other, and holds the elastic body 300.

The elastic body 300 includes a contact portion 302 located between the first holding surface 142a and the second holding surface 206b. In other words, the contact portion 302 is a part located between the first holding surface 142a and the second holding surface 206b in the elastic body 300. The contact portion 302 includes a first contact point 302a that contacts the first holding surface 142a, and a second contact point 302b that contacts the second holding surface 206b.

The first contact point 302a is in contact with the end of the annular projection 142, i.e., an outer periphery of the first holding surface 142a. The second contact point 302b is provided at an inner edge of a surface facing the separating portion 206 in the elastic body 300. Accordingly, the second contact point 302b is located radially inside the first contact point 302a in the elastic body 300.

The elastic body 300 includes a pressed portion 304. The pressed portion 304 is located radially outside the contact portion 302, and is in contact with the protrusion 208. The pressed portion 304 is provided at an outer area in a surface facing the separating portion 206 in the elastic body 300, and contacts an inner edge of the end of the protrusion 208.

The pressed portion 304 is located radially outside the first contact point 302a. The first contact point 302a is located radially outside the second contact point 302b. The pressed portion 304 is located closer to the mounting plate 140 with respect to the first contact point 302a. The first contact point 302a is located closer to the mounting plate 140 with respect to the second contact point 302b.

Figure 8:
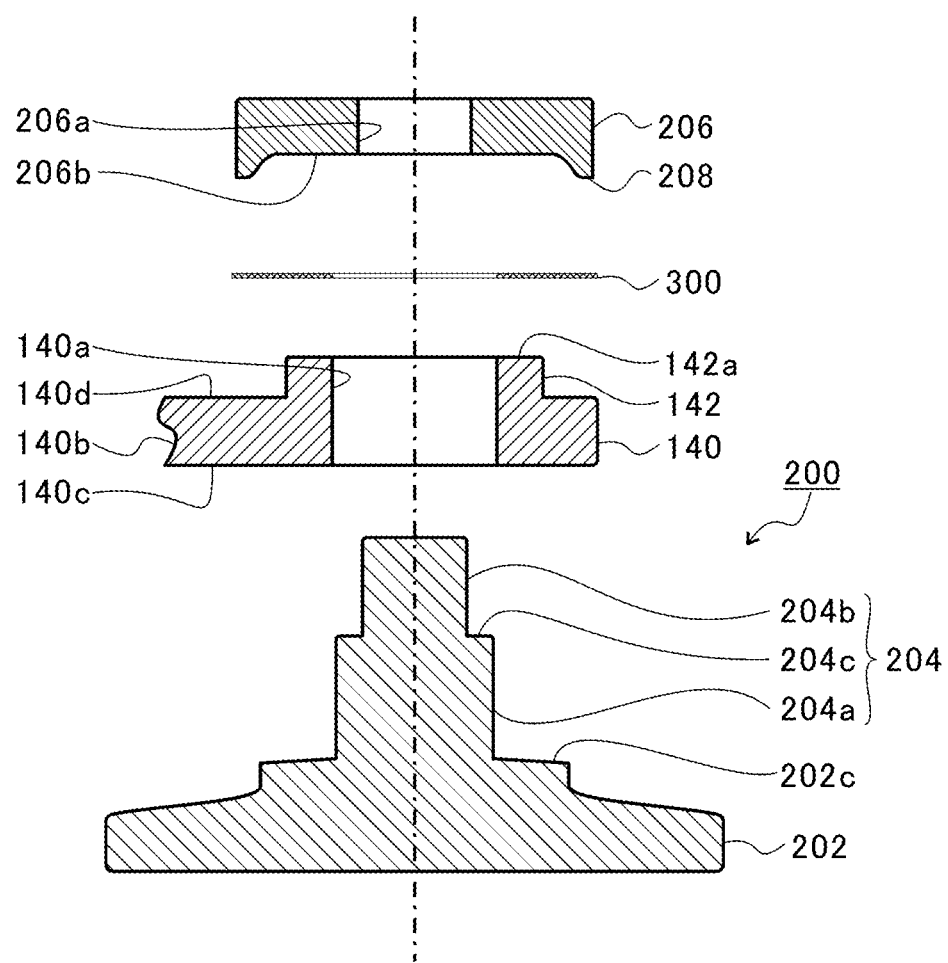
FIG. 8 is an illustration of the valve unit, the mounting plate, and the elastic body before assembly.
Figure 9:
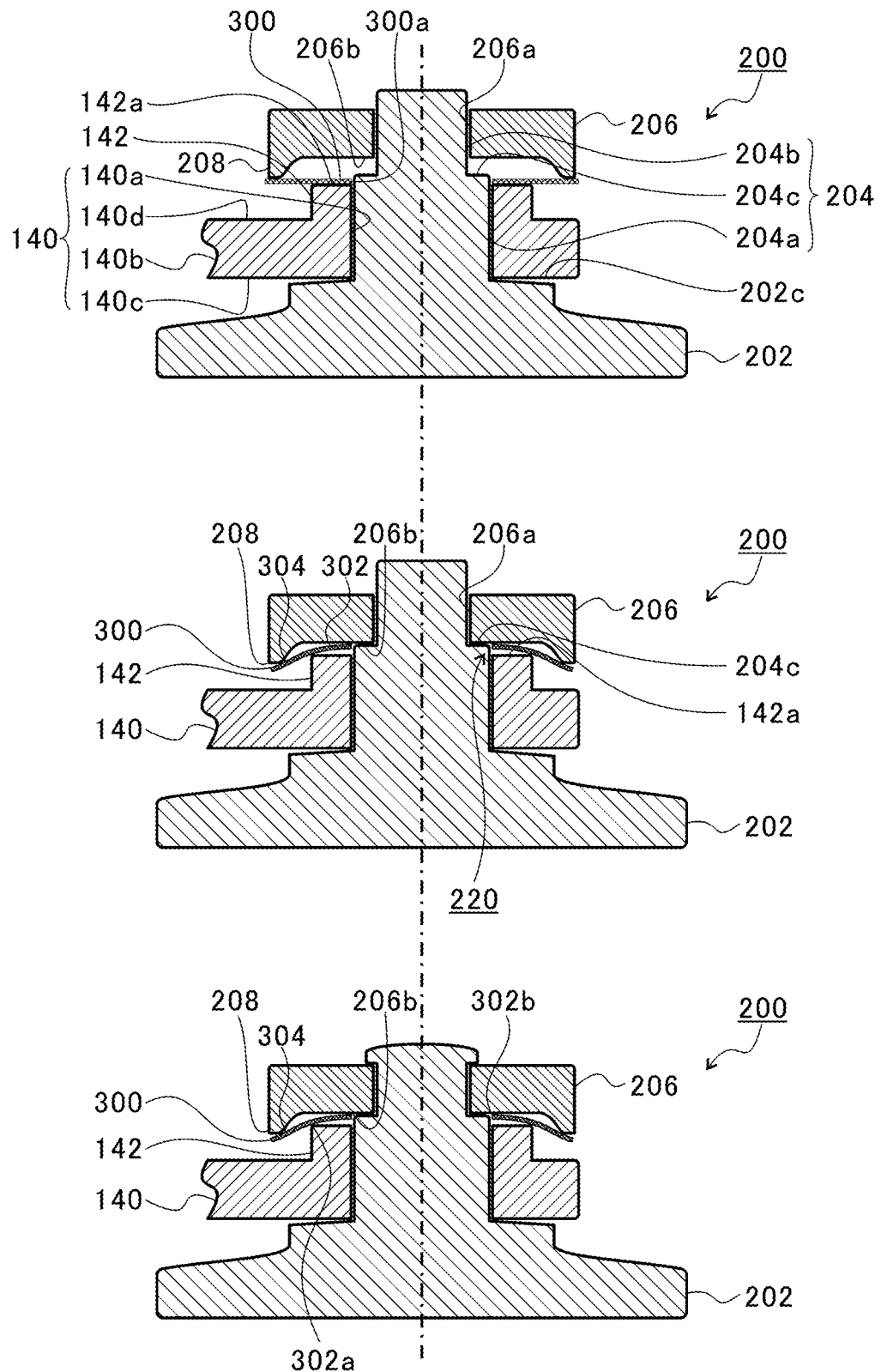
FIG. 9 is an illustration of an assembly process of the valve unit, the mounting plate, and the elastic body.

FIG. 8 is an illustration of the valve unit 200, the mounting plate 140, and the elastic body 300 before assembly. FIG. 9 is an illustration of an assembly process of the valve unit 200, the mounting plate 140, and the elastic body 300. As shown in FIG. 8, when the valve unit 200, the mounting plate 140, and the elastic body 300 are assembled to each other, the shaft portion 204 is inserted into the mounting plate 140, the elastic body 300, and the separating portion 206 in this order.

Specifically, as shown in the upper row of FIG. 9, firstly, the larger-diameter section 204a is inserted into the insertion hole 140a of the mounting plate 140. The first surface 140a of the mounting plate 140 is in surface contact with the tapered surface 202c. In this state, the step surface 204c of the shaft portion 204 protrudes from the first holding surface 142a of the mounting plate 140.

Subsequently, the larger-diameter section 204a is inserted into the through hole 300a of the elastic body 300. An inner diameter of the through hole 300a is larger than the diameter of the larger-diameter section 204a. In a state where the larger-diameter section 204a is inserted into the through hole 300a, the elastic body 300 is in surface contact with the first holding surface 142a. The thickness of the elastic body 300 (see L4 in FIG. 7) is smaller than the maximum separation in the axial direction between the mounting plate 140 and the separating portion 206 (see L3 in FIG. 7). Accordingly, in this state, the step surface 204c of the shaft portion 204 protrudes from the through hole 300a of the elastic body 300.

Subsequently, the smaller-diameter section 204b is inserted into the hole 206a of the separating portion 206. In this state, the protrusion 208 of the separating portion 206 contacts the elastic body 300. Then, from the state shown in the upper row of FIG. 9, the separating portion 206 is axially pressed against the mounting plate 140 as shown in the middle row of FIG. 9. Since an outer diameter of the step surface 204c is larger than the inner diameter of the hole 206a, the second holding surface 206b contacts the step surface 204c and the separating portion 206 stops.

While axially pressing the separating portion 206 against the mounting plate 140, the protrusion 208 presses the pressed portion 304 of the elastic body 300 toward the mounting plate 140. In this state, the contact portion 302 of the elastic body 300 is held by the first holding surface 142a and the second holding surface 206b. Accordingly, the separating portion 206 is axially pressed from the state shown in the upper row of FIG. 9 to the state shown in the middle row of FIG. 9 with countering the elastic force of the elastic body 300. In other words, in the state shown in the middle row of FIG. 9, the biasing force is applied to the protrusion 208 of the separating portion 206 in a direction to separate the separating portion from the mounting plate 140. In addition, the biasing force is applied to the annular projection 142 of the mounting plate 140 in a direction from the separating portion 206 toward the valve body 202.

Then, while maintaining the above state, the end of the smaller-diameter section 204b is caulked as shown in the lower row of FIG. 9. As a result, the pressed portion 304 of the elastic body 300 is constantly subjected to a pressing force toward the mounting plate 140 by the protrusion 208. Also, the first contact point 302a of the elastic body 300 is constantly subjected to a pressing force toward the separating portion 206 by the annular projection 142. In addition, the second contact point 302b of the elastic body 300 is constantly subjected to a pressing force toward the mounting plate 140 by the second holding surface 206b. As such, the restoring force of the elastic body 300 serves as the biasing force that biases the mounting plate 140 toward the valve body 202.

According to the above configuration, a variation in the biasing force of the elastic body 300 can be curbed by dimensional control of the projection height of the protrusion 208 (see L1 in FIG. 7), the projection height of the annular projection 142 (see L2 in FIG. 7), and the axial length of the larger-diameter section 204. Compared to a conventional dimensional control of a press-formed disc spring, the dimensional control of the valve unit 200 and the mounting plate 140 is easier. Therefore, according to the present disclosure, the variation of the biasing force of the elastic body 300 can be easily curbed compared to the conventional method.

Figure 10:
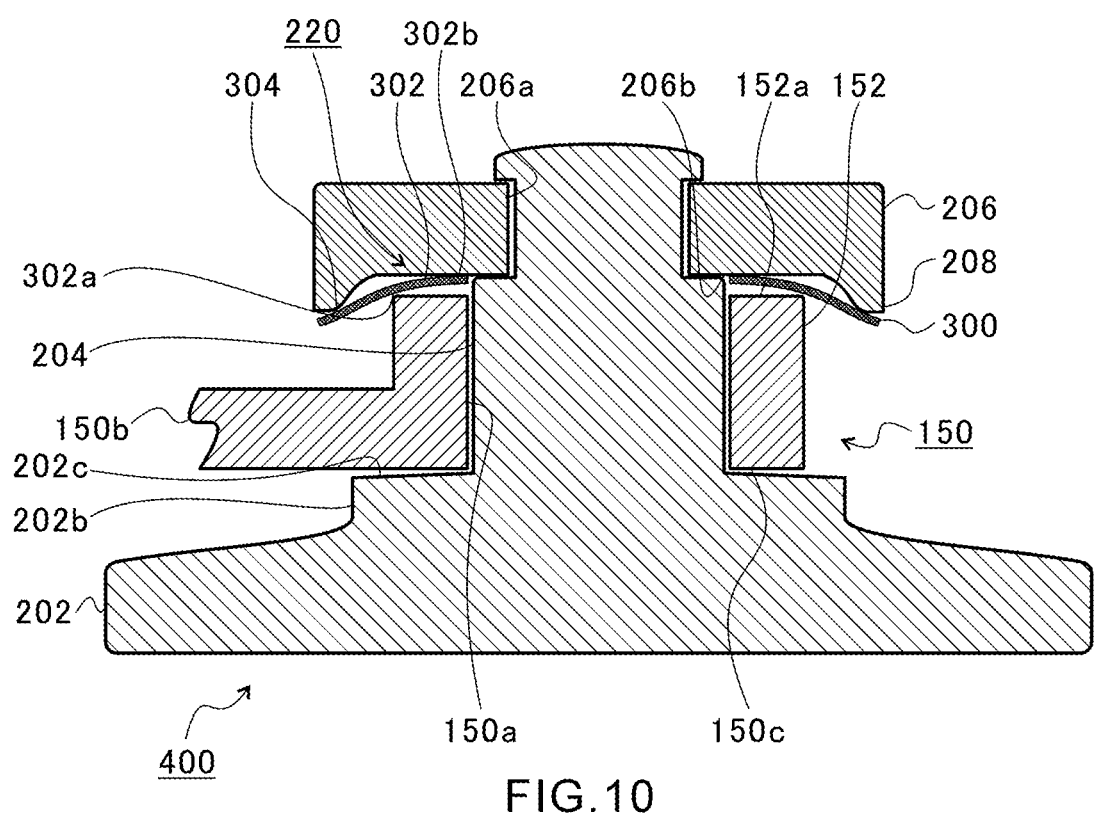
FIG. 10 is a schematic cross-sectional view of a valve unit, a mounting plate, and the elastic body according to a first variant.

FIG. 10 is a schematic cross-sectional view of a valve unit 400, a mounting plate 150 and the elastic body 300 according to a first variant. In the first variant, a mounting plate 150 is provided in place of the mounting plate 140 of the above embodiment. The first variant differs from the above embodiment only in the configuration of the mounting plate 150. All other configurations are the same as those in the above embodiment. Accordingly, configurations different from those in the above embodiment will be described, and the same configurations as those in the above embodiment will be assigned with the same reference signs and detailed descriptions thereof will be omitted.

As shown in FIG. 10, the mounting plate 150 comprises a body 150b including an insertion hole 150a. The body 150b is provided with a first surface 150a facing the tapered surface 202c. The body 150b is also provided with an annular projection 152 protruding toward the separating portion 206. A first holding surface 152a is formed at an end of the annular projection 152 in the projecting direction. An outer diameter of the annular projection 152 is smaller than the outer diameter of the separating portion 206.

In the above embodiment, the second surface 140d of the body 140b is axially opposed to the protrusion 208. In contrast, in this first variant, only a part of the body 150b of the mounting plate 150 is axially opposed to the protrusion 208.

In the first variant, the holding portion 220 also includes the first holding surface 152a of the mounting plate 150 and the second holding surface 206b of the separating portion 206. The contact portion 302 of the elastic body 300 is located in the holding portion 220. The contact portion 302 includes the first contact point 302a that contacts the first holding surface 152a, and the second contact point 302b that contacts the second holding surface 206b.

The separating portion 206 includes the protrusion 208. The protrusion 208 is located radially outside the holding portion 220. The end of the protrusion 208 protrudes toward the mounting plate 150 beyond the first holding surface 152a. The pressed portion 304 of the elastic body 300 is in contact with the protrusion 208. As such, in the first variant, the holding portion 220 and the contact portion 302 are provided radially inside the protrusion 208 and the pressed portion 304, as those in the above embodiment. The elastic body 300 is then pressed toward the mounting plate 150 by the protrusion 208 provided on the separating portion 206. Accordingly, the first variant also achieves the same effects as those in the above embodiment.

Figure 11A:
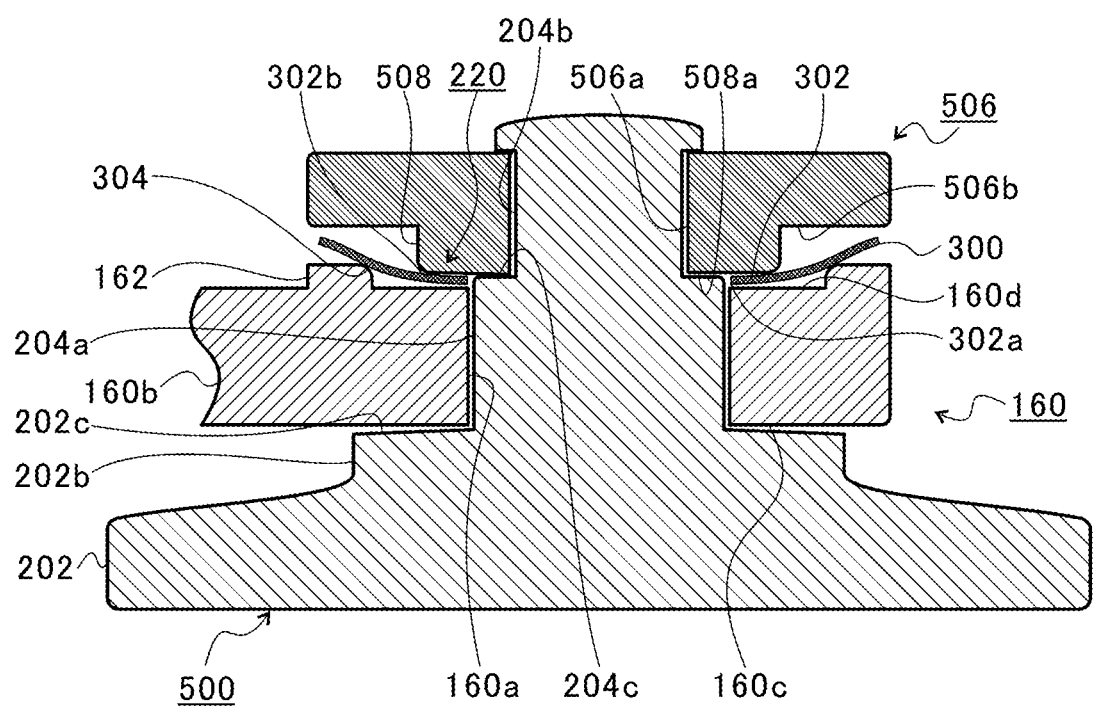
FIG. 11A is a schematic cross-sectional view of a valve unit, a mounting plate, and the elastic body according to a second variant.

FIG. 11A is a schematic cross-sectional view of a valve unit 500, a mounting plate 160 and the elastic body 300 according to a second variant. In the second variant, the mounting plate 160 is provided in place of the mounting plate 140 of the above embodiment, and a separating portion 506 is provided in place of the separating portion 206 of the above embodiment. The second variant differs from the above embodiment only in the configurations of the mounting plate 160 and the separating portion 506. All other configurations are the same as those in the above embodiment. Accordingly, configurations different from those in the above embodiment will be described, and the same configurations as those in the above embodiment will be assigned with the same reference signs and detailed descriptions thereof will be omitted.

As shown in FIG. 11A, the mounting plate 160 comprises a body 160b including an insertion hole 160a. The body 160b is provided with a first surface 160a facing the tapered surface 202c. The body 160b is also provided with a first holding surface 160d on a side opposite to the first surface 160a. The first holding surface 160d is opposed to the separating portion 506. A protrusion 162 protruding toward the separating portion 506 is provided radially outside the first holding surface 160d.

The protrusion 162 extends in an annular shape at a radially outer area with respect to the first holding surface 160d. The protrusion 162 is spaced apart from the insertion hole 160a in the radial direction. In a state where the first surface 160a contacts the tapered surface 202c, the step surface 204c of the shaft portion 204 protrudes from the insertion hole 160a. In this state, an end of the protrusion 162 protrudes toward the separating portion 506 beyond the step surface 204c.

The separating portion 506 is made of a sheet metal that is separate from the valve body 202 and the shaft portion 204. The separating portion 506 has a disk shape including a hole 506a in its center, and is axially spaced apart from the valve body 202. The smaller-diameter section 204b of the shaft portion 204 is inserted into the hole 506a of the separating portion 506.

The separating portion 506 has a surface (may also be referred to as the "mounting plate side opposing surface" in this disclosure) 506b opposed to the mounting plate 160. In this variant, an outer diameter of the surface 506b is substantially equal to an outer diameter of the protrusion 162. The surface 506b is provided with an annular projection 508. The annular projection 508 protrudes from the surface 506b toward the mounting plate 160. The annular projection 508 is provided on a periphery of the hole 506a. A second holding surface 508a is provided at an end of the annular projection 508 in the projecting direction. The second holding surface 508a is configured as an annular flat surface.

The separating portion 506 is attached to the valve body 202 and the shaft portion 204 by caulking the end of the smaller-diameter section 204b. In this state, the second holding surface 508a is in contact with the step surface 204c. An outer diameter of the annular projection 508 is larger than the outer diameter of the step surface 204c and is smaller than an inner diameter of the protrusion 162. Accordingly, the second holding surface 508a is axially opposed to the first holding surface 160d at an area radially outside the part facing the step surface 204c.

The second holding surface 508a and the first holding surface 160d are axially spaced apart from each other. A gap between the second holding surface 508a and the first holding surface 160d defines the maximum axial separation between the mounting plate 160 and the separating portion 506. The holding portion 220 includes the second holding surface 508a and the first holding surface 160d.

In addition, the protrusion 162 on the mounting plate 160, and the second holding surface 508a and the holding portion 220 are spaced apart from each other in the radial direction.

Furthermore, the end of the protrusion 162 protrudes toward the separating portion 506 beyond the second holding surface 508a of the annular projection 508. In other words, an axial height of the protrusion 162 is larger than the maximum separation between the second holding surface 508a and the first holding surface 160d.

The elastic body 300 includes the contact portion 302 located between the second holding surface 508a and the first holding surface 160d. In other words, the contact portion 302 is a part located between the second holding surface 508a and the first holding surface 160d in the elastic body 300. The contact portion 302 is provided with the first contact point 302a that contacts the first holding surface 160d, and the second contact point 302b that contacts the second holding surface 508a.

The first contact point 302a is provided at an inner edge of a surface facing the mounting plate 160 in the elastic body 300. The second contact point 302b contacts the end of the annular projection 508, i.e., an outer periphery of the second holding surface 508a. Accordingly, the first contact point 302a is located radially inside the second contact point 302b.

Furthermore, the elastic body 300 includes the pressed portion 304. The pressed portion 304 is located radially outside the contact portion 302, and contacts the protrusion 162. The pressed portion 304 is provided at an outer area in a surface facing the mounting plate 160, and contacts an inner edge of the end of the protrusion 162.

The pressed portion 304 is located radially outside the second contact point 302b. The second contact point 302b is located radially outside the first contact point 302a. Furthermore, the pressed portion 304 is located closer to the separating portion 506 with respect to the second contact point 302b. The second contact point 302b is located closer to the separating portion 506 with respect to the first contact point 302a.

As a result, the pressed portion 304 of the elastic body 300 is constantly subjected to a pressing force toward the separating portion 506 by the protrusion 162. Furthermore, the second contact point 302b of the elastic body 300 is constantly subjected to a pressing force toward the mounting plate 160 by the annular projection 508. In addition, the first contact point 302a of the elastic body 300 is constantly subjected to a pressing force toward the separating portion 506 by the first holding surface 160d. The restoring force of the elastic body 300 serves as a biasing force that biases the mounting plate 160 toward the valve body 202.

According to the above configuration, a variation in the biasing force of the elastic body 300 can be curbed by dimensional control of the projection height of the protrusion 162, the projection height of the annular projection 508, and the axial length of the larger-diameter section 204. In other words, the same effects as those in the above embodiment can be realized by the second variant.

Figure 11B:
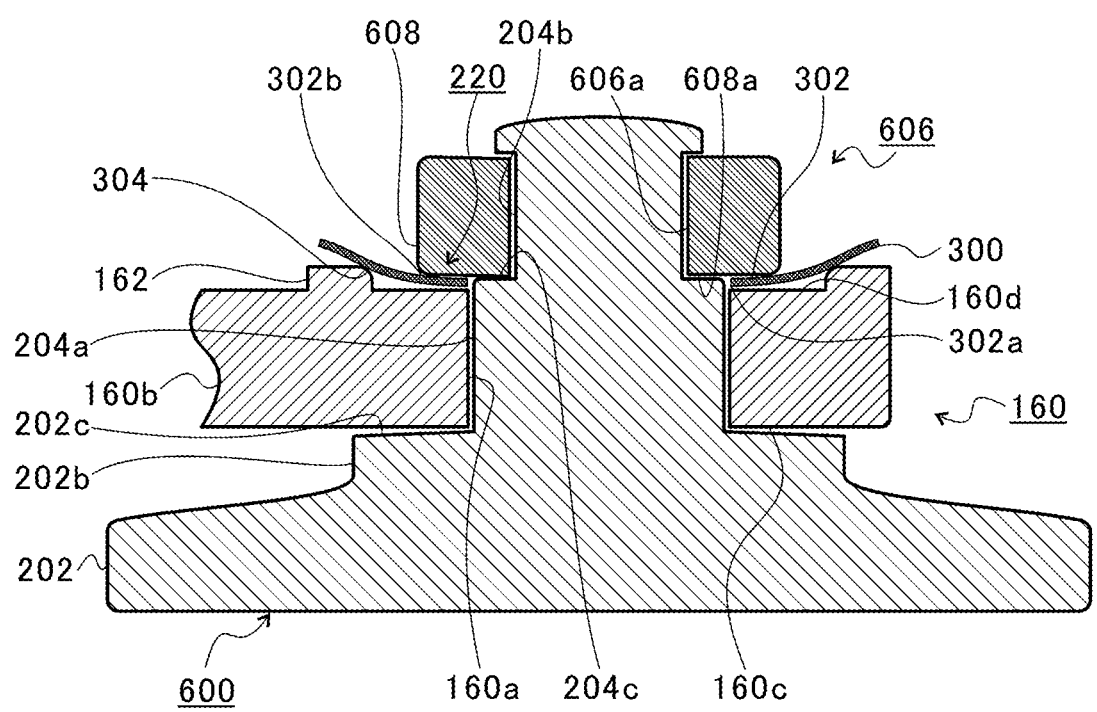
FIG. 11B is a schematic cross-sectional view of a valve unit, a mounting plate, and the elastic body according to a third variant.

FIG. 11B is a schematic cross-sectional view of a valve unit 600, the mounting plate 160 and the elastic body 300 according to a third variant. In the third variant, a separating portion 606 is provided in place of the separating portion 506 of the above second variant. The third variant differs from the above second variant only in the configuration of the separating portion 606. All other configurations are the same as those in the above second variant. Accordingly, configurations different from those in the above second variant will be described, and the same configurations as those in the above second variant will be assigned with the same reference signs and detailed descriptions thereof will be omitted.

As shown in FIG. 11B, the separating portion 606 is made of a sheet metal that is separate from the valve body 202 and the shaft portion 204. The separating portion 606 includes an annular body 608 including a hole 606a in its center. The separating portion 606 is axially spaced apart from the valve body 202. The smaller-diameter section 204b of the shaft portion 204 is inserted into the hole 606a of the separating portion 606.

The annular body 608 of the separating portion 606 includes a second holding surface 608a opposed to the mounting plate 160. The second holding surface 608a is configured as an annular flat surface and contacts the step surface 204C. An outer diameter of the annular body 608 and the second holding surface 608a is larger than the outer diameter of the step surface 204c, and is smaller than the inner diameter of the protrusion 162. Accordingly, the second holding surface 608a is axially opposed to the first holding surface 160d at an area radially outside the part facing the step surface 204c.

The second holding surface 608a and the first holding surface 160d are axially spaced apart from each other. A gap between the second holding surface 608a and the first holding surface 160d defines the maximum axial separation between the mounting plate 160 and the separating portion 606. The holding portion 220 includes the second holding surface 608a and the first holding surface 160d.

As is clear from comparing FIG. 11B with FIG. 11A, the separating portion 606 of the third variant only includes the annular projection 508 of the second variant. In other words, the separating portion 606 of the third variant is configured by omitting a radially outer part with respect to the annular projection 508 from the separating portion 506 of the second variant. Accordingly, the separating portion 606 differs from the separating portion 506 only in that the separating portion 606 does not include a part axially opposed to the protrusion 162. The other configurations are the same as those in the separating portion 506. The third variant also achieves the same effects as those in the above second variant.

Figure 12:
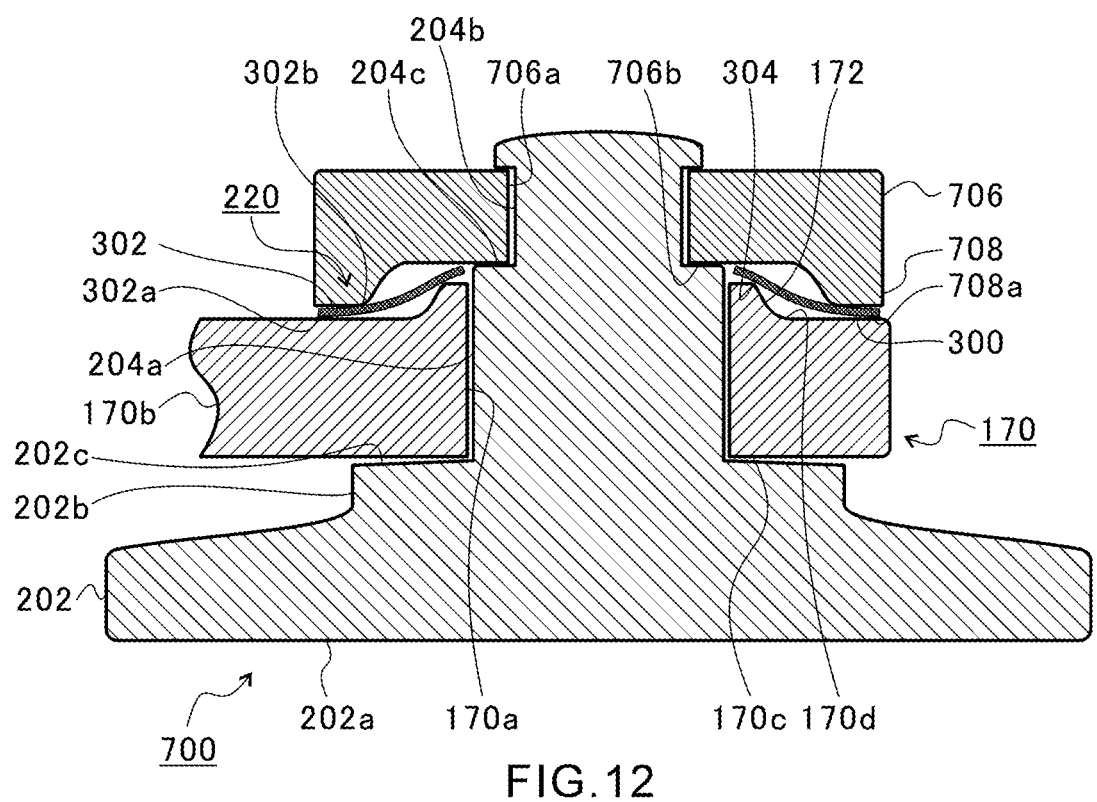
FIG. 12 is a schematic cross-sectional view of a valve unit, a mounting plate, and the elastic body according to a fourth variant.

FIG. 12 is a schematic cross-sectional view of a valve unit 700, a mounting plate 170, and the elastic body 300 according to a fourth variant. In the fourth variant, a mounting plate 170 is provided in place of the mounting plate 140 of the above embodiment, and a separating portion 706 is provided in place of the separating portion 206 of the above embodiment. The fourth variant differs from the above embodiment only in the configurations of the mounting plate 170 and the separating portion 706. All other configurations are the same as those in the above embodiment. Accordingly, configurations different from those in the above embodiment will be described, and the same configurations as those in the above embodiment will be assigned with the same reference signs and detailed descriptions thereof will be omitted.

As shown in FIG. 12, the mounting plate 170 comprises a body 170b including an insertion hole 170a. The body 170b includes a first surface 170a facing the tapered surface 202c. The body 170b also includes a first holding surface 170d on a side opposite to the first surface 170a. The first holding surface 170d is opposed to the separating portion 706. A protrusion 172 protruding toward the separating portion 706 is provided radially inside the first holding surface 170d.

The protrusion 172 is provided radially inside the first holding surface 170d, and extends in an annular shape. The protrusion 172 is provided at a periphery of the insertion hole 170a. In other words, the insertion hole 170a passes through from the first surface 170a to the protrusion 172. In a state where the first surface 170a contacts the tapered surface 202c, the step surface 204c of the shaft portion 204 protrudes from the insertion hole 170a.

The separating portion 706 is made of a sheet metal that is separate from the valve body 202 and the shaft portion 204. The separating portion 706 has a disk shape including a hole 706a formed in its center, and is axially spaced apart from the valve body 202. The smaller-diameter section 204b of the shaft portion 204 is inserted into the hole 706a of the separating portion 706.

The separating portion 706 includes a surface 706b opposed to the mounting plate 170. The surface 706b is provided with an annular projection 708. The annular projection 708 protrudes from the surface 706b toward the mounting plate 170. The annular projection 708 is provided on an outer periphery of the separating portion 706. A second holding surface 708a is provided on an end of the annular projection 708 in the projecting direction. The second holding surface 708a is configured as an annular flat surface.

The separating portion 706 is attached to the valve body 202 and the shaft portion 204 by caulking the end of the smaller-diameter section 204b. In this state, the surface 706b is in contact with the step surface 204c. An inner diameter of the annular projection 708 is larger than the outer diameter of the step surface 204c, and is also larger than an outer diameter of the protrusion 172. The second holding surface 708a is axially opposed to the first holding surface 170d.

The second holding surface 708a and the first holding surface 170d are axially spaced apart from each other. A gap between the second holding surface 708a and the first holding surface 170 defines the maximum axial separation between the mounting plate 170 and the separating portion 706. The gap between the second holding surface 708a and the first holding surface 170d is larger than the thickness of the elastic body 300. The holding portion 220 includes the second holding surface 708a and the first holding surface 170d.

Furthermore, the protrusion 172 on the mounting plate 170, and the second holding surface 708a and the holding portion 220 are radially spaced apart from each other. In addition, an end of the protrusion 172 protrudes toward the separating portion 706 beyond the second holding surface 708a of the annular projection 708. In other words, the axial height of the protrusion 172 is larger than the maximum separation between the second holding surface 708a and the first holding surface 170d.

The elastic body 300 includes the contact portion 302 located between the second holding surface 708a and the first holding surface 170d. In other words, the contact portion 302 is a part located between the second holding surface 708a and the first holding surface 170d in the elastic body 300. The contact portion 302 includes the first contact point 302a contacting the first holding surface 170d, and the second contact point 302b contacting the second holding surface 708a.

The first contact point 302a is located at an outer periphery of a surface facing the mounting plate 170 in the elastic body 300. The second contact point 302b contacts the end of the annular projection 708, i.e., an inner edge of the second holding surface 708a. Accordingly, the second contact point 302b is located radially inside the first contact point 302a.

Furthermore, the elastic body 300 includes the pressed portion 304. The pressed portion 304 is located radially inside the contact portion 302, and is in contact with the protrusion 172. The pressed portion 304 is provided at an inner area in a surface facing the mounting plate 170 in the elastic body 300, and contacts an outer periphery of the end of the protrusion 172.

The pressed portion 304 is located radially inside the second contact point 302b. The second contact point 302b is located radially inside the first contact point 302a. Furthermore, the pressed portion 304 is located closer to the separating portion 706 with respect to the second contact point 302b. The second contact point 302b is located closer to the separating portion 706 with respect to the first contact point 302a.

As a result, the pressed portion 304 of the elastic body 300 is constantly subjected to a pressing force toward the separating portion 706 by the protrusion 172. Furthermore, the second contact point 302b of the elastic body 300 is constantly subjected to a pressing force toward the mounting plate 170 by the annular projection 708. In addition, the first contact point 302a of the elastic body 300 is constantly subjected to a pressing force toward the separating portion 706 by the first holding surface 170d. The restoring force of the elastic body 300 serves as a biasing force that biases the mounting plate 170 toward the valve body 202.

According to the above configuration, a variation in the biasing force of the elastic body 300 can be curbed by dimensional control of the projection height of the protrusion 172, the projection height of the annular projection 708, and the axial length of the larger-diameter section 204a. In other words, the same effects as those in the above embodiment can be realized by the fourth variant.

Figure 13:
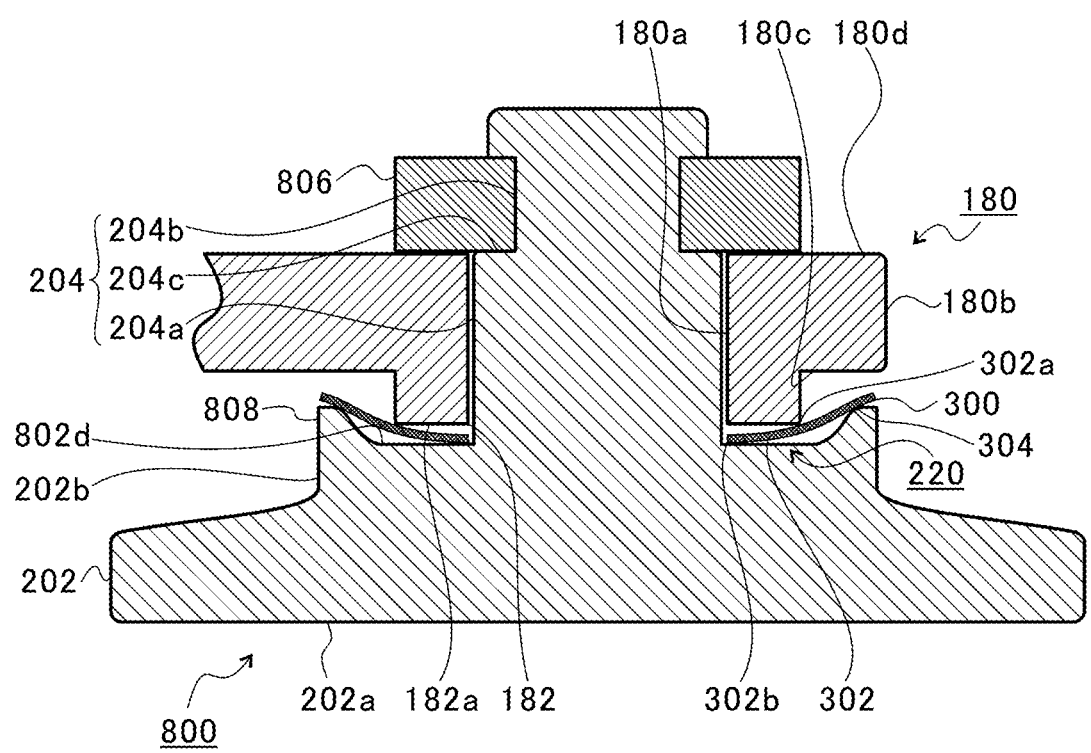
FIG. 13 is a schematic cross-sectional view of a valve unit, a mounting plate, and the elastic body according to a fifth variant.

FIG. 13 is a schematic cross-sectional view of a valve unit 800, a mounting plate 180, and the elastic body 300 according to the fifth variant. Configurations different from those in the above embodiment will be described, and the same configurations as those in the above embodiment will be assigned with the same reference signs and detailed descriptions thereof will be omitted. The valve unit 800 includes the valve body 202, the shaft portion 204, and a separating portion 806. The valve body 202 includes the contact surface 202a. Furthermore, the valve body 202 is provided with the bulge 202b on a side opposite to the contact surface 202a. The bulge 202b has a circular cross-sectional shape perpendicular to the axial direction, and extends in the axial direction. In this variant, the axial length of the bulge 202b is smaller than the axial thickness from the contact surface 202a to the bulge 202b.

The bulge 202b is located on the side opposite to the contact surface 202a, i.e., closer to the shaft portion 204. A second holding surface 802d that crosses the axial direction of the shaft 204 is formed at an end of the bulge 202b. In this variant, the second holding surface 802d is an annular flat surface orthogonal to the shaft portion 204. However, the second holding surface 802d may be inclined in the same manner as the above tapered surface 202c. The shaft portion 204 axially extends from the center of the second holding surface 802d. Furthermore, a protrusion 808 is provided radially outside the second holding surface 802d. The protrusion 808 is provided on an outer periphery of the bulge 202b, and is radially spaced apart from the shaft portion 204.

The mounting plate 180 comprises a body 180b including an insertion hole 180a. The body 180b is provided with a first surface 180a opposed to the second holding surface 802d. The body 180b is also provided with a second surface 180d on a side opposite to the first surface 180a.

The first surface 180a is provided with an annular projection 182. The annular projection 182 protrudes from the first surface 180a toward the valve body 202. The annular projection 182 is provided on an inner edge of the mounting plate 180. A first holding surface 182a is provided on an end of the annular projection 182 in the projecting direction. The first holding surface 182a is configured as an annular flat surface. The insertion hole 180a passes through from the second surface 180d to the first holding surface 182a.

The larger-diameter section 204a of the shaft portion 204 is inserted into the insertion hole 180a. An inner diameter of the insertion hole 180a is larger than the diameter of the larger-diameter section 204a. Furthermore, a length from the second surface 180d to the first holding surface 182a, i.e., the axial length of the insertion hole 180a is smaller than the axial length of the larger-diameter section 204a.

The smaller-diameter section 204b is inserted into the separating portion 806. In a state where the separating portion 806 is pressed against the step surface 204c, the end of the smaller-diameter section 204b is caulked. As a result, relative movement of the separating portion 806 and the shaft portion 204 is restricted.

The elastic body 300 is provided in a gap formed between the valve body 202 and the mounting plate 180. More specifically, the first holding surface 182a of the annular projection 182 is spaced apart from and opposed to the second holding surface 802d of the valve body 202 in the axial direction. The maximum separation between the first holding surface 182a and the second holding surface 802d is larger than the thickness of the elastic body 300. The holding portion 220 includes the first holding surface 182a and the second holding surface 802d.

The protrusion 808 on the valve body 202, and the first holding surface 182a and the holding portion 220 are radially spaced apart from each other. Furthermore, an end of the protrusion 808 protrudes toward the mounting plate 180 beyond the first holding surface 182a of the annular projection 182. In other words, an axial height of the protrusion 808 is larger than the maximum separation between the first holding surface 182a and the second holding surface 802d.

The elastic body 300 include the contact portion 302 located between the first holding surface 182a and the second holding surfaces 802d. In other words, the contact portion 302 is a part located between the first holding surface 182a and the second holding surface 802d in the elastic body 300. The contact portion 302 includes the first contact point 302a contacting the first holding surface 182a, and the second contact point 302b contacting the second holding surface 802d.

The first contact point 302a contacts the end of the annular projection 182, i.e., an outer periphery of the first holding surface 182a. The second contact point 302b is provided at an inner edge of a surface closer to the valve body 202 in the elastic body 300. Accordingly, the first contact point 302a is located radially outside the second contact point 302b.

The elastic body 300 includes the pressed portion 304. The pressed portion 304 is located radially outside the contact portion 302, and contacts the protrusion 808. The pressed portion 304 is provided on a radially outer area in a surface closer to the valve body 202 in the elastic body 300, and contacts an inner edge of the end of the protrusion 808.

The pressed portion 304 is located radially outside the first contact point 302a. The first contact point 302a is located radially outside the second contact point 302b. Furthermore, the pressed portion 304 is located closer to the mounting plate 180 with respect to the first contact point 302a. The first contact point 302a is located closer to the mounting plate 180 with respect to the second contact point 302b.

According to the above configuration, the elastic body 300 presses the valve body 202 in a direction spaced apart from the mounting plate 180. A variation in the biasing force of the elastic body 300 is curbed by dimensional control of the projection height of the protrusion 808, the projection height of the annular projection 182, and the axial length of the larger-diameter section 204a. In other words, the same effects as those in the above embodiment can be realized by the fifth variant.

Although the embodiments of the present disclosure have been described above with reference to the accompanying drawings, the present disclosure is not limited thereto. It is obvious that a person skilled in the art can conceive of various examples of variations or modifications within the scope of the claims, which are also understood to belong to the technical scope of the present disclosure.

In the above embodiment and each of the variants, the examples in which the valve device 100 is a wastegate valve that opens and closes the wastegate port 37 are described. However, the valve device 100 is not limited thereto, and can be applied to other valves that open and close an opening. For example, the valve device 100 may be applied to a valve that opens and closes an opening that connects two turbine scroll flow paths in the turbine housing of a twin scroll turbocharger.

In the above embodiment and the first variant, the protrusion 208 provided on the separating portion 206 is positioned radially outside the holding portion 220. However, in the above embodiment and the first variant, the annular projection 142 may be located radially outside the protrusion 208. In this case, the protrusion 208 is located radially inside the holding portion 220.

In the above fifth variant, the protrusion 808 provided on the valve body 202 is located radially outside the holding portion 220. However, in the above fifth variant, the annular projection 182 may be provided radially outside the protrusion 808. In this case, the protrusion 808 is located radially inside the holding portion 220.

In the above fifth variant, the valve body 202 is provided with the second holding surface 802d and the protrusion 808, and the mounting plate 180 is provided with the annular projection 182 and the first holding surface 182a. However, in the fifth variation, the valve body 202 may be provided with the annular projection 182 and the first holding surface 182a, and the mounting plate 180 may be provided with the second holding surface 802d and the protrusion 808. In this case, the protrusion 808 may be provided radially inside or radially outside the annular projection 182.

In any case, the holding portion may comprise the first holding surface provided on the mounting plate, and the second holding surface provided on the valve unit and axially spaced apart from the first holding surface. Furthermore, the protrusion may be provided on either the valve unit or the mounting plate, and the end of the protrusion may protrude in the axial direction beyond the first and second holding surfaces. In addition, the elastic body may include the contact portion located between the first and second holding surfaces, and the pressed portion located radially inside or radially outside the contact portion and contacting the protrusion.

In the above embodiment, the second variant, the fourth variant, and the fifth variant, an opposing portion axially opposed to the protrusion is provided on either the valve unit or the mounting plate that is not provided with the protrusion. Specifically, the second surface 140d of the embodiment, the surface 506b of the second variant, the first holding surface 170d of the fourth variant, and the first surface 180*a* of the fifth variant serve as the opposing portion axially opposed to the protrusion. As such, the elastic body 300 is less likely to be exposed to the outside when the opposing portion is provided, compared to a case where the opposing portion is not provided. As a result, the durability of the elastic body 300 in a high temperature environment is improved when the opposing portion is provided.

What is claimed is:

1. A valve structure comprising:
   a valve unit including a valve body, a shaft portion extending from the valve body in an axial direction, and a separating portion provided on the shaft portion and spaced apart from the valve body in the axial direction;
   a mounting plate located between the valve body and the separating portion and including an insertion hole into which the shaft portion is inserted;
   a holding portion including a first holding surface provided on the mounting plate, and a second holding surface provided on the valve unit and spaced apart from the first holding surface in the axial direction;
   a protrusion provided on one of the valve unit and the mounting plate, an end of the protrusion protruding in the axial direction beyond the first holding surface and the second holding surface; and
   an elastic body including a contact portion located between the first holding surface and the second holding surface, and a pressed portion located inside or outside the contact portion in a radial direction of the shaft portion and contacting the protrusion.

2. The valve structure according to claim 1, comprising an opposing portion provided on the other of the valve unit and the mounting plate and opposed to the protrusion in the axial direction.

3. A turbocharger comprising a valve structure according to claim 1.

4. A turbocharger comprising a valve structure according to claim 2.

* * * * *